(12) United States Patent
Wu et al.

(10) Patent No.: US 10,949,114 B2
(45) Date of Patent: Mar. 16, 2021

(54) DATA STORAGE MANAGEMENT DEVICES USING UTILIZATION RATES AND METHODS FOR DATA STORAGE MANAGEMENT USING UTILIZATION RATES

(71) Applicant: EMC IP Holding Company LLC, Hopkinton, MA (US)

(72) Inventors: Gary Jialei Wu, Shanghai (CN); Dong Wang, Shanghai (CN); Lu Lei, Shanghai (CN); Aaron Yurun Wu, Shanghai (CN); Nolan Shu Zhu, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/439,588

(22) Filed: Jun. 12, 2019

(65) Prior Publication Data

US 2020/0104051 A1    Apr. 2, 2020

(30) Foreign Application Priority Data

Sep. 30, 2018 (CN) .......................... 201811160003.6

(51) Int. Cl.
*G06F 3/06* (2006.01)
*G06F 11/14* (2006.01)
(Continued)

(52) U.S. Cl.
CPC .............. *G06F 3/065* (2013.01); *G06F 3/067* (2013.01); *G06F 3/0613* (2013.01);
(Continued)

(58) Field of Classification Search
CPC ....... G06F 3/065; G06F 11/1458–1466; G06F 11/2056–2087
See application file for complete search history.

(56) References Cited

U.S. PATENT DOCUMENTS 7,596,570 B1 * 9/2009 Emigh ................ G06F 11/1453
8,140,791 B1 * 3/2012 Greene ............... G06F 11/1464
711/162

(Continued)

FOREIGN PATENT DOCUMENTS

GB           2448566 A  * 10/2008  ............ G06F 9/5011

OTHER PUBLICATIONS

Dell. "Elastic Cloud Storage (ECS)." Sep. 11, 2017. Dell. Version 3.1. pp. 11-42. (Year: 2017).*

*Primary Examiner* — Nathan Sadler
(74) *Attorney, Agent, or Firm* — Amin, Turocy & Watson, LLP

(57) ABSTRACT

Embodiments of the present disclosure provide a method, a device and a computer program product of storage management. According to example implementations of the present disclosure, in response to data to be replicated from a first storage zone to a second storage zone, a utilization rate of resources associated with the replication is determined; the utilization rate of the resources is compared with a predetermined threshold utilization rate; and in response to the utilization rate of the resources being less than the threshold utilization rate, the replication of the data is initiated from the first storage zone to the second storage zone. Therefore, the present disclosure can automatically adjust replication behaviors for various scenarios, thereby realizing a more flexible data replication policy, and enabling more efficient use of various resources.

20 Claims, 5 Drawing Sheets

(51) Int. Cl.
*G06F 9/50* (2006.01)
*G06F 11/20* (2006.01)

(52) U.S. Cl.
CPC .......... *G06F 3/0631* (2013.01); *G06F 3/0653* (2013.01); *G06F 9/505* (2013.01); *G06F 11/1456* (2013.01); *G06F 11/1464* (2013.01); *G06F 11/2069* (2013.01)

(56) References Cited

U.S. PATENT DOCUMENTS

| | | | |
|---|---|---|---|
| 8,554,918 B1* | 10/2013 | Douglis | G06F 11/3485 |
| | | | 707/640 |
| 9,185,188 B1* | 11/2015 | Li | G06F 3/0647 |
| 9,672,116 B1* | 6/2017 | Chopra | G06F 11/1464 |
| 10,452,296 B1* | 10/2019 | Greenwood | G06F 3/067 |
| 2002/0147733 A1* | 10/2002 | Gold | G06F 11/1448 |
| 2004/0098423 A1* | 5/2004 | Chigusa | G06F 11/1461 |
| 2013/0173537 A1* | 7/2013 | Wilkinson | G06F 11/1471 |
| | | | 707/611 |
| 2017/0003895 A1* | 1/2017 | Hatfield | G06F 11/2058 |
| 2019/0303035 A1* | 10/2019 | Danilov | G06F 3/0604 |

* cited by examiner

Legend:
FIG. 3 - Prior Art

DATA STORAGE MANAGEMENT DEVICES USING UTILIZATION RATES AND METHODS FOR DATA STORAGE MANAGEMENT USING UTILIZATION RATES

RELATED APPLICATION

The present application claims the benefit of priority to Chinese Patent Application No. 201811160003.6, filed on Sep. 30, 2018, which application is hereby incorporated into the present application by reference herein in its entirety.

FIELD

Embodiments of the present disclosure generally relate to the field of data storage, and more specifically, to a method, a device and a computer program product of storage management.

BACKGROUND

A data storage system, such as Elastic Cloud Storage (ECS), typically provides additional protection for user data by backing up the same in one or more storage zones. The backup of user data involves multiple types of data replication across a plurality of storage zones. At a higher level (i.e., macroscopically), each type of data replication has its own business logic. In contrast, at a lower level, in the current replication solution, when data are replicated from a source storage zone to a target storage zone, resource utilization (for example, processing resources of the source storage zone, storage resources of the target storage zone or communication resources between storage zones) associated with the replication is not taken into account. This reduces the data replication efficiency, affects user experience, for example, restricts the upload rate of the local data due to shortage of processing resources of the source storage zone, and wastes resources, such as bandwidth or the like, in some cases. Furthermore, the conventional data replication solution includes developing different logic architectures for different replication requirements (for example, types of replication), which is inefficient for a new replication requirement.

SUMMARY

Embodiments of the present disclosure provide a method, a device and a computer program product of storage management.

In a first aspect of the present disclosure, a method of storage management is provided. The method comprises: in response to data to be replicated from a first storage zone to a second storage zone, determining a utilization rate of resources associated with the replication; comparing the utilization rate of the resources with a predetermined threshold utilization rate; and in response to the utilization rate of the resources being less than the threshold utilization rate, initiating replication of the data from the first storage zone to the second storage zone.

In a second aspect of the present disclosure, a device of storage management is provided. The device comprises at least one processing unit and at least one memory. The at least one memory is coupled to the at least one processing unit and stores instructions that are executable by the at least one processing unit. The instructions, when executed by the at least one processing unit, cause the device to execute acts that comprise: in response to data to be replicated from a first storage zone to a second storage zone, determining a utilization rate of resources associated with the replication; comparing the utilization rate of the resources with a predetermined threshold utilization rate; and in response to the utilization rate of the resources being less than the threshold utilization rate, initiating replication of the data from the first storage zone to the second storage zone.

In a third aspect of the present disclosure, a computer program product is provided. The computer program product is tangibly stored on a non-transitory computer readable medium and comprises machine executable instructions, and the machine executable instructions, when executed by a machine, causes a machine to implement any step of the method as described according to the first aspect of the present disclosure.

The Summary section is provided to introduce a selection of concepts in a simplified form that will be further described below in the Detailed Description. The Summary section is not intended to identify key or essential features of the present disclosure, nor is it intended to be used to limit the scope of the present disclosure.

BRIEF DESCRIPTION OF THE DRAWINGS

The above and other objectives, features, and advantages of the present disclosure will become more apparent, through the following detailed description of the exemplary embodiments of the present disclosure with reference to the accompanying drawings, in which the same reference signs generally refer to the same elements.

Throughout the drawings, the same or similar reference signs refer to the same or similar elements.

DETAILED DESCRIPTION OF EMBODIMENTS

Embodiments of the present disclosure will now be described in detail with reference to the accompanying drawings. Although the drawings illustrate various embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open terms that mean "includes, but is not limited to". The term "or" is to be read as "and/or" unless the context clearly indicates otherwise. The term "based on" is to be read as "based at least in part on". The term "an exemplary embodiment" and "an embodiment" are to be read as "at least one embodiment". The term "another embodiment" is to be read as "at least one other embodiment". The terms "first", "second" and the like may refer to different or the same objects. Other definitions, either explicit or implicit, may be included below.

Figure 1:
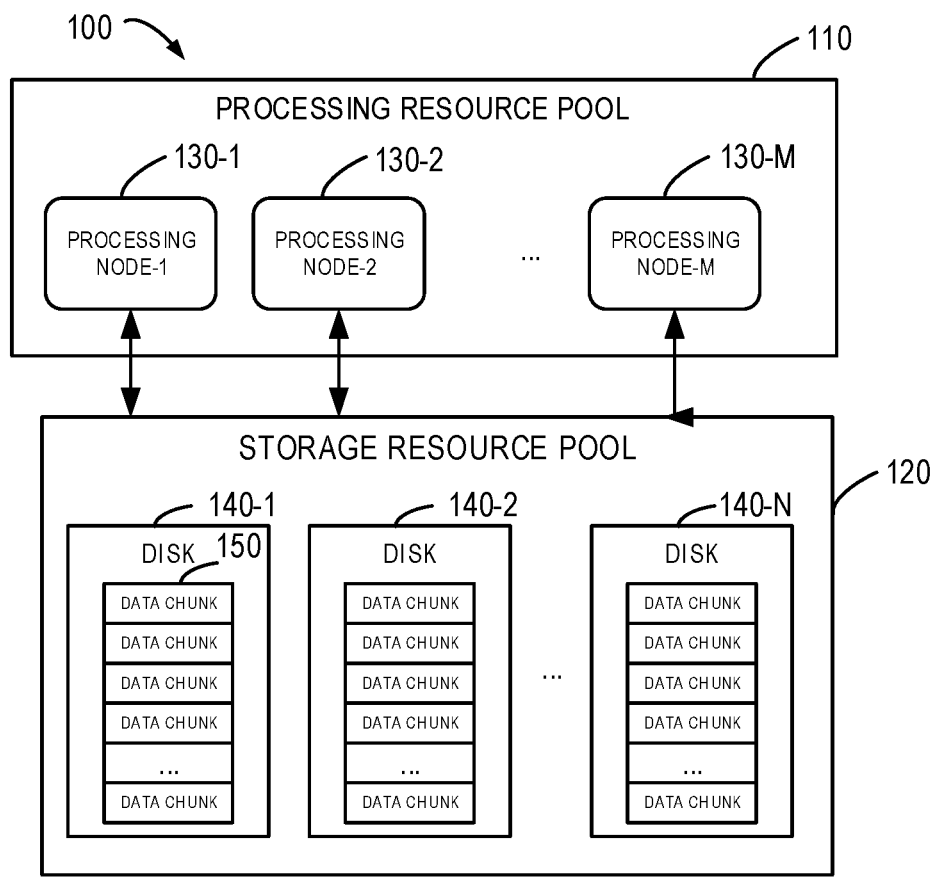
FIG. 1 illustrates a schematic diagram of architecture of a storage zone according to embodiments of the present disclosure.

FIG. 1 illustrates a schematic diagram of architecture of a storage zone 100 according to embodiments of the present disclosure. It would be appreciated that the structure and functionality of the storage zone 100 as shown in FIG. 1 are provided merely for the purpose of illustration, without implying any limitation as to the scope of the present disclosure. The embodiments of the present disclosure may be embodied in different structures and/or functionalities.

As shown in FIG. 1, the storage zone 100 includes a processing resource pool 110 and a storage resource pool 120. The processing resource pool 110 includes a plurality of processing nodes 130-1, 130-2, . . . , 130-M (which are collectively referred to as processing nodes 130, where M is a positive integer). The storage resource pool 120 includes a plurality of storage disks 140-1, 140-2, . . . , 140-N (which are collectively referred to as storage disks 140, where N is a positive integer). The "storage disk" described here may refer to any non-volatile storage medium existing currently or to be developed in the future, such as a disk, optical disk or solid-state disk (SSD), or the like. However, it would be appreciated that this is provided only for ease of description, without implying any limitation as to the scope of the present disclosure. Each processing node 130 and the storage disk 140 are connected to each other via a bus.

Each storage disk 140 is divided into a plurality of data chunks 150 each having a fixed size, for example 10 GB. The data chunks are shared by respective user objects. At a lower level, user objects are represented as data segments stored in different data chunks 150.

In order to provide additional protection for user data, the user data are usually backed up. The storage system typically includes a plurality of separated storage zones. The "separated storage zone" described herein may refer to storage zones distributed logically, and in the description below, the storage zones separated spatially are taken as an example, such as storage zones distributed in different cities. However, it would be appreciated that this is provided only for ease of description, without implying any limitation as to the scope of the present disclosure. By replicating data in a unit of data chunk 150 to different storage zones 100, the user data are protected at a geographic level.

Figure 2A:
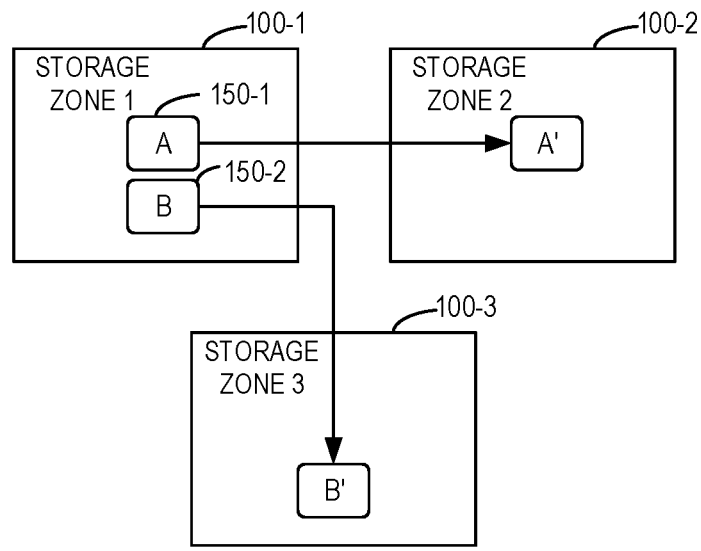
FIGS. 2A to 2C illustrate schematic diagrams of different types of replication performed between respective storage zones according to embodiments of the present disclosure.
Figure 2B:
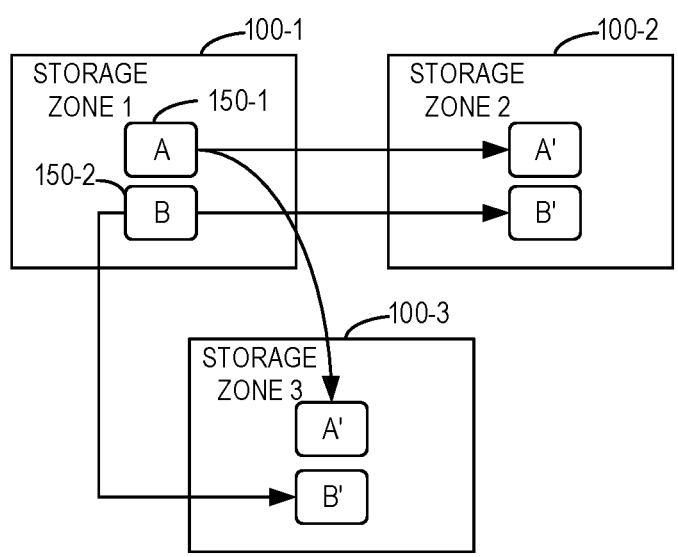
Figure 2C:
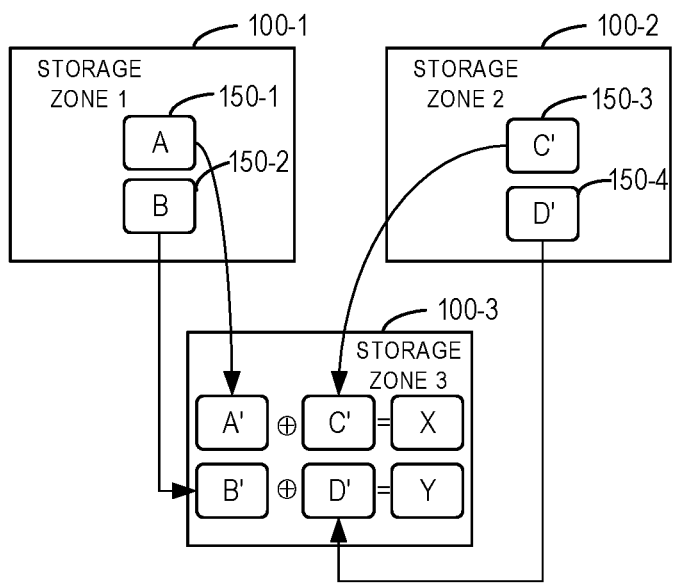

FIGS. 2A to 2C illustrate a schematic diagram of executing different types of replication performed between respective storage zones 100 according to embodiments of the present disclosure. Although FIGS. 2A to 2C only illustrate a quite limited number of storage zones 100-1, 100-2 and 100-3 (which are collectively referred to storage zones 100) and data chunks 150-1, 150-2, 150-3 and 150-4 (which are collectively referred to data chunks 150), there may be more storage zones and storage chunks, and the number is only provided as an example, without limitation. In FIGS. 2A to 2C, the data chunk A' is a backup of the data chunk A, the data chunk B' is a backup of the data chunk B, and so on.

FIG. 2A illustrates a schematic diagram of standard replication. In the standard replication, a data chunk in the storage zone 100-1 is replicated only to another storage zone. For example, the data chunk 150-1 is replicated to the storage zone 100-2, and the data chunk 150-2 is replicated to the storage zone 100-3. In general, data are only backed up once.

FIG. 2B illustrates a schematic diagram of full replication. In the full replication, all data chunks in the storage zone 100-1 are replicated to the storage zones 100-2 and 100-3, respectively. In general, the data are backed up twice. As compared with the standard replication, the full replication incurs higher hardware and communication costs but provides a higher protection level.

FIG. 2C illustrates a schematic diagram of geo-passive replication. In the geo-passive replication, all the data chunks in the storage zones 100-1 and 100-2 are replicated to the storage zone 100-3, and run a XOR operation in the storage zone 100-3. As such, when data loss occurs in the storage zone 100-1, the lost data may be determined uniquely from respective data chunks in the storage zone 100-2 and the storage zone 100-3. The geo-passive replication is applicable to a user expecting to have active storage zones (for example, the storage zone 100-1 and the storage zone 100-2) and a pure backup storage zone (for example, the storage zone 100-3).

Figure 3:
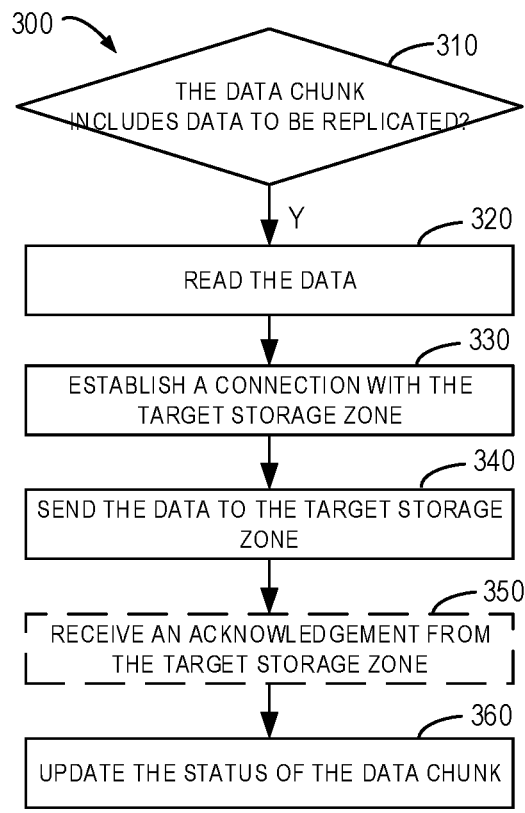
FIG. 3 illustrates a flowchart of an example of a method of blind data chunk replication.

The existing storage system performs blind data chunk replication, and FIG. 3 illustrates a flowchart of an example of a method 300 of the blind data chunk replication. For example, the method 300 may be performed by the processing node 130 as shown in FIG. 1. The acts involved in the method 300 will be described below with the storage zones 100 as shown in FIG. 1 and FIG. 2A. It would be appreciated that the method 300 may further include additional acts and/or may skip the acts as shown, and the scope of the present disclosure is not limited the aspect.

With the data chunk 150-1 in FIG. 2A as an example, at block 310, the processing node 130 detects whether the data chunk 150-1 includes data to be replicated. If it is detected that the data chunk 150-1 includes data to be replicated, the processing node 130 reads data from the data chunk 150-1 at block 320. At block 330, the processing node 130 establishes a connection between the source storage zone 100-1 and the target storage zone 100-2. As used herein, the source storage zone refers to a storage zone where data to be replicated are located, and the target storage zone refers to a storage zone to which the data to be replicated will be replicated.

At block 340, the processing node 130 sends the read data to the target storage zone 100-2. Optionally, after receiving and storing data, the target storage zone 100-2 sends acknowledgement information to the source storage zone 100-1. The source storage zone receives the acknowledgement from the target storage zone 100-2 at block 350, and then updates the status of the data chunk 150-1 at block 360, for example, the status of the data chunk 150-1 is updated as: the data chunk 150-1 excludes data to be replicated.

The method of blind data chunk replication as shown in FIG. 3 is data chunk replication at a lower level, and the resource utilization associated with replication is not taken into account, such as processing resources of the source storage zone, the storage resources of the target storage zone or the communication resources between storage zones. This reduces the data replication efficiency, affects the user experience, for example restricting the upload rate of the local data due to shortage of processing resources at the source storage zone, and waste resources in some cases. For example, if a failure occurs in the network, continuous attempt to reconnect may bring about unnecessary disk I/O, or if the capacity of the target storage zone is full, the data transmission may result in waste of the communication resources.

In addition, the method of blind data chunk replication develops different logic architectures for different replication requirements (for example, types of replication), which is inefficient with respect to a new replication requirement. Therefore, the current replication solution is not flexible enough as seen from a high level, and inefficient for utilization of resources as seen from a low level.

The embodiments of the present disclosure provide a solution for storage management, which can take utilization of various resources associated with the replication into full consideration, and perform replication for a replication requirement specified by a user input, so as to implement policy-based replication. The solution can automatically adjust the replication action, improve the replication efficiency, and improve the user experience, such as a faster response speed, more replication action options and the like.

Figure 4:
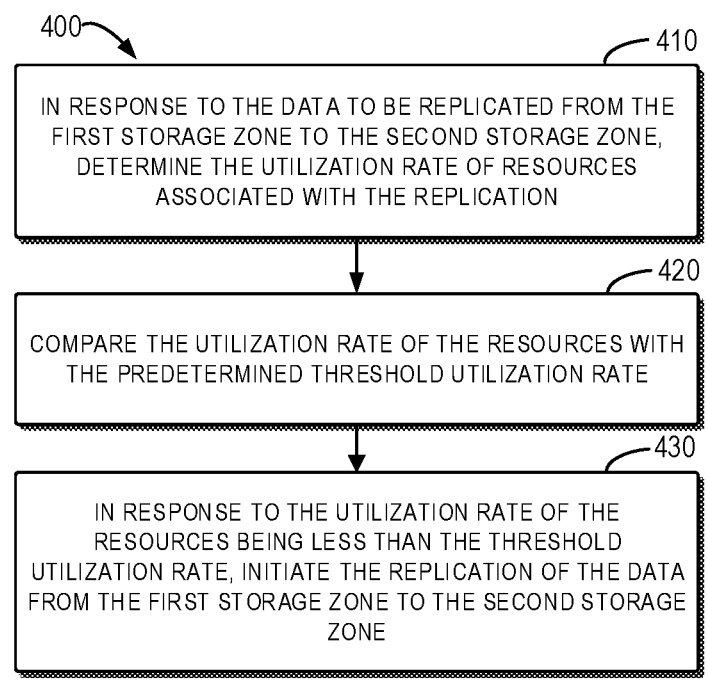
FIG. 4 illustrates a flowchart of an example of a method of storage management according to embodiments of the present disclosure.

FIG. 4 illustrates a flowchart of an example of a method 400 of storage management according to embodiments of the present disclosure. For example, the method 400 may be performed by the processing node 130 as shown in FIG. 1. The acts involved in the method 400 will be described below with reference to the storage zones 100 as shown in FIGS. 1 and 2A. It would be appreciated that the method 400 may further include additional acts not shown and/or may skip the acts as shown, and the scope of the present disclosure is not limited in the aspect.

With the data chunk 150-1 as an example, at block 410, in response to data to be replicated from the first storage zone 100-1 to the second storage zone 100-2, namely the data in the data chunk 150-1, the processing node 130 determines a utilization rate of the resources associated with the replication.

According to some embodiments, the resources include processing resources for processing data at the first storage zone 100-1. By determining one or both of response time of processing resources and a number of tasks to utilize the processing resources, the processing node 130 may determine the utilization rate of the processing resources. The utilization rate of the processing resources is related to the user experience. In a case that there are sufficient processing resources, a user may obtain faster response from a storage zone.

According to some embodiments, resources include communication resources between the first storage zone 100-1 and the second storage zone 100-2. By determining one or both of the delay and throughput of the communication resources, the processing node 130 may determine the utilization rate of the communication resources. The utilization rate of the communication resources is of vital importance to data transmission between different storage zones.

According to some embodiments, the resources include storage resources of the second storage zone 100-2, and by determining utilization of a quota of the storage resources in the second storage zone 100-2 allocated to the first storage zone 100-1, the processing node 130 may determine the utilization rate of the storage resources. Specifically, it is assumed that the second storage zone 100-2 allocates a predetermined size of storage capacity (i.e., a quota) to the first storage zone 100-1, the processing node 130 at the first storage zone 100-1 records and accumulates a sum of size of data transmitted successfully from the first storage zone 100-1 to the second storage zone 100-2, and determines the utilization by comparing the sum with the quota.

It would be appreciated that, although the processing resources, communication resources and storage resources are given herein as examples of resources, these are provided merely for illustration, without limitation, and other types of resources are possible.

At block 420, the processing node 130 compares the utilization rate of the resources determined at block 410 with a predetermined threshold utilization rate. The processing node 130 stores the comparison result of the resource utilization rates into a table, for example, as shown in Table 1. It would be appreciated that Table 1 is only an example for illustration, and other structures may be used to record the comparison results.

TABLE 1

| Items | Values |
| --- | --- |
| Processing resources | Sufficient |
| Connection to storage zone 100-2 | Good |
| Connection to storage zone 100-3 | Poor |
| Storage resources of storage zone 100-2 | Sufficient |
| Storage resources of storage zone 100-3 | Insufficient |

Figure 5:
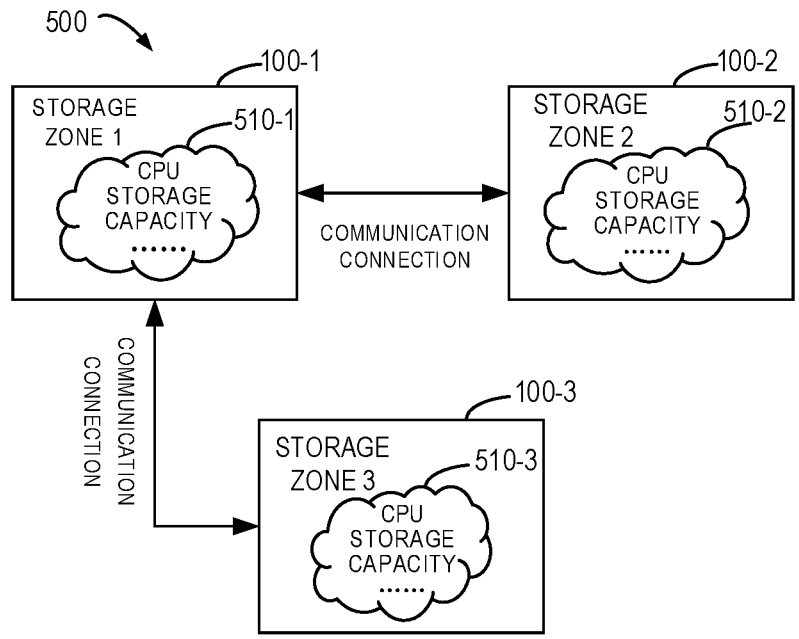
FIG. 5 illustrates a schematic diagram of an example storage system including storage zones according to embodiments of the present disclosure.

FIG. 5 illustrates a schematic diagram of an example storage system 500 including storage zones 100 according to embodiments of the present disclosure. As shown, the respective storage zones 100-1, 100-2 and 100-3 preserve tables 510-1, 510-2 and 510-3, which are collectively referred to as tables 510, for example, Table 1. When the storage zones 100-1, 100-2 and 100-3 act as the source storage zone, respectively, the storage zones initiate replication with reference to the tables preserved therein, respectively.

Continuing to refer to FIG. 4, at block 430, in response to the utilization rate of the resources being lower than a threshold utilization rate, the processing node 130 initiates the replication from the first storage zone 100-1 to the second storage zone 100-2. For example, a low utilization rate of the processing resources indicates that the processing resources are sufficient, and replication performed at this time will not affect interaction between the user and the storage system. A low utilization rate of communication resources indicates that communication resources are sufficient, which can ensure smooth data transmission. A low utilization rate of the storage resources indicates that the second storage zone 100-2 has a sufficient available storage space.

According to some embodiments, resources include multiple types of resources with different priorities, and the processing node 130 determines the utilization rates of resources according to priorities of the respective resources. For example, since the processing resources directly affect the user experience, the processing resources have the highest priority in order to ensure the user to have best experience. Once it is detected that the utilization rate of the processing resources is greater than a predetermined threshold utilization rate (for example, there is overlong response time of the processing resources or an excess number of tasks to utilize the processing resources), neither replication nor detection on the utilization rates of other resources will be performed.

For another example, since the sequence of the resources involved in replication is varied (i.e., the communication resources are first involved, and then the storage resources are involved), the priority of the communication resources is higher than that of the storage resources. Once it is detected the utilization rate of the communication resources is greater than a predetermined threshold utilization rate (for example, there is an overlong delay of the communication resources (which indicates a poor connection state) or exceedingly high throughput (which indicates a heavy network load)), neither replication nor detection on the utilization rate of the storage resources will be performed. By assigning priorities to the resources, the present disclosure can better satisfy the user's demand, without the need of detecting utilization rates of all resources each time, thereby saving the I/O overhead.

According to some embodiments, in response to the utilization rate of the storage resources at the storage zone 100-2 being greater than the threshold utilization rate, the processing node 130 requests to initiate the replication from the first storage zone 100-1 to the third storage zone 100-3 different than the second storage zone 100-2. Therefore, it can avoid that, in a case that the quota allocated by the second storage zone 100-2 to the first storage zone 100-1 has been run out (more particularly, in a case that the second storage zone 100-2 does not include any available storage resource), the first storage zone 100-1 still transmits data to the second storage zone, thereby utilizing various resources more efficiently.

According to some embodiments, a type of replication is specified by a user input and includes at least standard replication, full replication and geo-passive replication, and/or desired time period of the replication is specified by the user input. Although an example of using the type of replication and the desired time period as replication requirements is given herein, this is provide only for illustration, without limitation. There may be other replication requirements according to actual conditions of the user.

An example implementation of the method 400 according to the embodiments of the present disclosure will be described herein with reference to FIG. 1 and FIGS. 2A to 2C. A policy may be defined as follows:
If condition is true, action [to target storage zone(s)] is performed.

The condition may be based on a resource utilization rate of a storage zone, or may be defined by the user input. The condition defined by the user input may include:
C1—full replication required, and
C2—geo-passive replication required with storage zone 100-3.

The condition based on a resource utilization rate of a storage zone may include:
C3—storage capacity of storage zone 100-3 being full,
C4—network delay to storage zone 100-3 being overlong,
C5—network throughput to storage zone 100-3 reaching the limit, and
C6—processing resources of storage zone 100-1 being shortage.

The actions may include: replicating, not replicating and replicating to another target storage zone. There may be other actions, such as reattempting to replicate after a specific interval. Based on the above definitions on the conditions and actions, the policy may be defined as follows:
P1—If full replication required is true,
replicate
to storage zones 100-2 and 100-3.
P2—If geo-passive required with target zone 100-3 is true,
replicate
to storage zone 100-3.
P3—If storage capacity of target zone 100-3 being full is true,
replicate
to storage zone 100-2.
P4—If network delay to storage zone 100-3 being overlong is true,
not to replicate.
P5—If network throughput to storage zone 100-3 reaching the limit is true,
not to replicate.
P6—If processing resources of storage zone 100-1 being shortage is true,
not to replicate.

Hence, prior to performing the replication of the data chunk 150, the processing node 130 detects the defined conditions according to the resource priorities, based on the user input and information in Table 1. For example, in Table 1, if the processing node 130 detects that: the connection to the storage zone 100-3 is poor (i.e., C4 or C5 is true), neither replication nor detection on the storage capacity utilization of the storage zone 100-3 will be performed. For another example, if the processing node 130 detects P3 (i.e., the storage zone 100-3 has been full), the replication procedure may be restored automatically by designating the storage zone 100-2 as the target storage zone.

A policy modification or addition/deletion may be performed for the policy. For example, if a user expects to stop replication, rather than replicating to other storage zones, when the target storage zone has been full, the policy may be modified as follows:
P3—If storage capacity of storage zone 100-3 being full is true,
not to replicate.

For another example, if a user expects not to replicate within a particular time period, a new policy may be added:
P7—If current date [2018, Oct. 01 2018, Oct. 07] is true,
not to replicate.

As can be seen from the above description, a policy-based data replication solution is implemented according to embodiments of the present disclosure. The solution can be adjusted flexibly according to the changes of the replication requirements and the resource utilization rate. If a user desires to change the replication behavior, the user may simply modify the policy, instead of developing architecture with different business logic. Therefore, the present disclosure achieves data replication having a higher efficiency and a lower cost.

Figure 6:
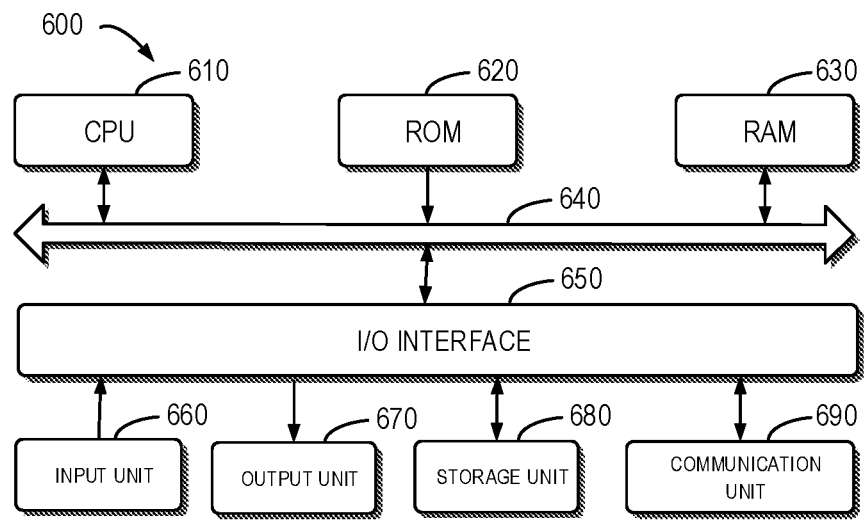
FIG. 6 illustrates a schematic block diagram of an example device that may be used to implement the embodiments of the present disclosure.

FIG. 6 illustrates a schematic block diagram of an example device 600 that may be used to implement the embodiments of the present disclosure. As shown, the device 600 includes a central processing unit (CPU) 610 which performs various appropriate acts and processing, based on computer program instructions stored in a read-only memory (ROM) 620 or computer program instructions loaded from a storage unit 680 to a random access memory (RAM) 630. The RAM 630 may also store therein various programs and data required for operations of the device 600. The CPU 610, the ROM 620 and the RAM 630 are connected via a bus 640 with one another. An input/output (I/O) interface 650 is also connected to the bus 640.

The following components in the device 600 are connected to the I/O interface 650: an input unit 660 such as a keyboard, a mouse and the like; an output unit 670 including various kinds of displays and loudspeakers, etc.; a storage unit 680 including a magnetic disk, an optical disk, and etc.; and a communication unit 690 including a network card, a modem, and a wireless communication transceiver, etc. The communication unit 690 allows the device 600 to exchange information/data with other devices through a computer network such as the Internet and/or various kinds of telecommunications networks.

Various processes and processing described above, e.g., the method 300 or 400, may be performed by the processing unit 610. For example, in some embodiments, the method 300 or 400 may be implemented as computer software programs that are tangibly included in a machine readable medium, e.g., the storage unit 680. In some embodiments, part or all of the computer programs may be loaded and/or installed onto the device 600 via the ROM 620 and/or the communication unit 690. When the computer program is loaded to the RAM 630 and executed by the CPU 610, one or more acts of the method 300 or 400 as described above may be performed.

The present disclosure may be a method, a device, a system, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionalities, and operations of possible implementations of systems, methods and computer program products according to various embodiments of the present disclosure. In this regard, each block in the flowchart or block diagrams may represent a module, a program segment, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method, comprising:
in response to data to be replicated from a first storage zone to a second storage zone, determining, by a system comprising a processor, a utilization rate of resources associated with replication;
comparing the utilization rate of the resources with a predetermined threshold utilization rate; and
in response to the utilization rate of the resources being less than the predetermined threshold utilization rate, initiating the replication of the data from the first storage zone to the second storage zone,
wherein the resources comprise a group of resources with different priorities, wherein determining the utilization rate of the resources is determined according to the different priorities of the group of resources, and wherein the different priorities comprise a sequence in which the group of resources is determined.

2. The method according to claim 1, wherein the resources comprise processing resources for processing the data at the first storage zone, and
wherein the determining the utilization rate of the resources comprises at least one of:
determining a response time of the processing resources, or
determining a number of tasks to utilize the processing resources.

3. The method according to claim 1, wherein the resources comprise communication resources between the first storage zone and the second storage zone, and
wherein the determining the utilization rate of the resources comprises determining a delay or a throughput of the communication resources.

4. The method according to claim 1, further comprising:
in response to the utilization rate of the storage resources being greater than the predetermined threshold utilization rate, requesting to initiate another replication of the data from the first storage zone to a third storage zone different than the second storage zone.

5. The method according to claim 1, wherein a type of the replication is specified by a user input and includes at least a standard replication, a full replication and a geo-passive replication.

6. The method according to claim 1, wherein a defined time period of the replication is specified by a user input.

7. The method according to claim 1, wherein the resources comprise storage resources of the second storage zone and wherein a second utilization rate of a second resources of the group of resources is not determined in response to a first utilization rate of a first resource of the group of resources being determined to be greater than the predetermined threshold utilization rate.

8. The method according to claim 7, wherein a first priority of the different priorities corresponding to the first utilization rate is higher than a second priority of the different priorities corresponding to the second utilization rate, and wherein the first resource comprises communication resources.

9. A device of storage management, comprising:
at least one processing unit;
at least one memory coupled to the at least one processing unit and storing instructions that are executable by the at least one processing unit, the instructions, when executed by the at least one processing unit, cause the device to execute acts that comprise:
in response to a request for data to be replicated from a first storage zone to a second storage zone, determining a utilization rate of resources associated with replication of the data;
comparing the utilization rate of the resources with a predetermined threshold utilization rate; and
in response to the utilization rate of the resources being less than the predetermined threshold utilization rate, initiating the replication of the data from the first storage zone to the second storage zone,
wherein the resources comprise a group of resources with different priorities, wherein determining the utilization rate of the resources is determined according to the different priorities of the group of resources, and wherein the different priorities comprise a sequence in which the group of resources is determined.

10. The device according to claim 9, wherein the resources comprise processing resources for processing the data at the first storage zone, and
wherein the determining the utilization rate of the resources comprises determining at least one value from a group of values, the group of values comprising:
a response time of the processing resources, and
a number of tasks to utilize the processing resources.

11. The device according to claim 9, wherein the resources comprise communication resources between the first storage zone and the second storage zone, and
wherein the determining the utilization rate of the resources comprises determining at least one of a delay or a throughput of the communication resources.

12. The device according to claim 9, wherein the replication is a first replication, and wherein the acts further comprise:
in response to the utilization rate of the storage resources being greater than the predetermined threshold utilization rate, requesting to initiate a second replication of the data from the first storage zone to a third storage zone different than the second storage zone.

13. The device according to claim 9, wherein a type of the replication is specified by a user input and incudes at least one of standard replication, full replication and geo-passive replication.

14. The device according to claim 9, wherein a desired time period of the replication is specified by a user input.

15. A non-transitory machine-readable medium, comprising executable instructions that, when executed by a processor, facilitate performance of operations, comprising:
in response to data to be replicated from a first storage zone to a second storage zone, determining a utilization rate of resources associated with replication;
comparing the utilization rate of the resources with a threshold utilization rate; and in response to the utilization rate of the resources being less than the threshold utilization rate, initiating the replication of the data from the first storage zone to the second storage zone, wherein the resources comprise a group of resources with different priorities, wherein determining the utilization rate of the resources is determined according to the different priorities of the group of resources, and wherein the different priorities comprise a sequence in which the group of resources is determined.

16. The non-transitory machine-readable medium of claim 15, wherein the resources comprise processing resources for processing the data at the first storage zone, and wherein the determining the utilization rate of the resources comprises at least one of:
determining a response time of the processing resources, or
determining a number of tasks to utilize the processing resources.

17. The non-transitory machine-readable medium of claim 15, wherein the resources comprise communication resources between the first storage zone and the second storage zone, and wherein the determining the utilization rate of the resources comprises determining a delay or a throughput of the communication resources.

18. The non-transitory machine-readable medium of claim 15, wherein the resources comprise storage resources of the second storage zone, and wherein the determining the utilization rate of the resources comprises determining a utilization of a quota of the storage resources in the second storage zone allocated to the first storage zone.

19. The non-transitory machine-readable medium of claim 15, wherein the resources comprise storage resources of the second storage zone and wherein a second utilization rate of a second resources of the group of resources is not determined in response to a first utilization rate of a first resource of the group of resources being determined to be greater than the predetermined threshold utilization rate.

20. The non-transitory machine-readable medium of claim 19, wherein a first priority of the different priorities corresponding to the first utilization rate is higher than a second priority of the different priorities corresponding to the second utilization rate, and wherein the first resource comprises communication resources.

* * * * *